United States Patent
Chen et al.

(10) Patent No.: US 10,789,531 B2
(45) Date of Patent: Sep. 29, 2020

(54) OPERATION DEVICE AND RELATED PRODUCTS

(71) Applicant: Shanghai Cambricon Information Technology Co., Ltd, Pudong New Area (CN)

(72) Inventors: Tianshi Chen, Pudong New Area (CN); Xiaobing Chen, Pudong New Area (CN); Zai Wang, Pudong New Area (CN); Shaoli Liu, Pudong New Area (CN)

(73) Assignee: SHANGHAI CAMBRICON INFORMATION TECHNOLOGY CO., LTD, Pudong New Area (CN)

( * ) Notice: Subject to any disclaimer, the term of this patent is extended or adjusted under 35 U.S.C. 154(b) by 0 days.

(21) Appl. No.: 16/537,820

(22) Filed: Aug. 12, 2019

(65) Prior Publication Data

US 2019/0385058 A1    Dec. 19, 2019

Related U.S. Application Data

(63) Continuation of application No. 16/476,261, filed as application No. PCT/CN2018/083379 on Apr. 17, 2018.

(30) Foreign Application Priority Data

Apr. 20, 2017   (CN) .......................... 2017 1 0261742
Apr. 25, 2017   (CN) .......................... 2017 1 0279655
Apr. 25, 2017   (CN) .......................... 2017 1 0279834

(51) Int. Cl.
| | | |
|---|---|---|
| G06N 3/08 | (2006.01) | |
| G06F 9/30 | (2018.01) | |
| G06N 20/00 | (2019.01) | |

(52) U.S. Cl.
CPC ................. *G06N 3/08* (2013.01); *G06F 9/30* (2013.01); *G06N 20/00* (2019.01)

(58) Field of Classification Search
CPC .......... G06N 3/08; G06N 20/00; G06N 3/082; G06N 3/063; G06F 9/30
See application file for complete search history.

(56) References Cited

U.S. PATENT DOCUMENTS

2017/0277628 A1*  9/2017  Paul ...................... G06N 3/049

* cited by examiner

*Primary Examiner* — Eric Nilsson
(74) *Attorney, Agent, or Firm* — Getech Law LLC; Jun Ye (57) ABSTRACT

The present application provides an operation device and related products. The operation device is configured to execute operations of a network model, wherein the network model includes a neural network model and/or non-neural network model; the operation device comprises an operation unit, a controller unit and a storage unit, wherein the storage unit includes a data input unit, a storage medium and a scalar data storage unit. The technical solution provided by this application has advantages of a fast computation speed and energy-saving.

15 Claims, 8 Drawing Sheets

OPERATION DEVICE AND RELATED PRODUCTS

TECHNICAL FIELD

The present application relates to an artificial intelligence technical field, and particularly relates to an operation device and related products.

BACKGROUND

The concept of deep learning stems from studies of artificial neural networks. A multilayer perceptron with multiple hidden layers is a deep-learning structure. By combining with low-level features, the deep learning forms a more abstract high level representing attribute categories or features, to discover a distributed feature representation of data.

It is found in practice that the existing deep-learning system usually needs to occupy a large amount of storage resources and operation resources, especially for complex operation, which greatly reduces the system operation efficiency. Therefore, the problem of how to reduce the storage resource and operation resource consumption in the deep learning has to be settled urgently.

SUMMARY

The embodiments of the present application provide an operation device and related products capable of reducing storage resource and operation resource consumption in the deep learning.

In a first aspect, the embodiments of the present invention provides an operation device which comprises a storage unit, an operation unit, and a controller unit, wherein
  the storage unit is configured to store data and instructions;
  the controller unit is configured to extract, from the storage unit, a first instruction including sorting instructions or sparse processing instructions and a first data corresponding to the first instruction including input neuron data and weight data;
  the operation unit is configured to, in response to the first instruction, perform an operation corresponding to the first instruction on the input neuron data and the weight data, to obtain an operation result.

In a second aspect, the embodiments of the present application provide an operation method applied to the operation device which comprises a storage unit, an operation unit, and a controller unit, wherein
  the storage unit is configured to store data and instructions;
  the controller unit is configured to extract, from the storage unit, a first instruction including sorting instructions or sparse processing instructions and a first data corresponding to the first instruction including input neuron data and weight data;
  the operation unit is configured to, in response to the first instruction, perform an operation corresponding to the first instruction on the input neuron data and the weight data, to obtain an operation result.

In a third aspect, the embodiments of the present application provide a neural network computing device which includes one or more operation devices according to the first aspect, wherein the neural network computing device is configured to acquire data to be operated and control information from other processing devices, perform specified neural network operation and transmit the execution result to other processing devices through the I/O interface;
  when the neural network computing device contains a plurality of said operation devices, the plurality of operation devices may be connected via a specific structure and transmit data;
  wherein, the plurality of operation devices conduct interconnect through Peripheral Component Interconnect-Express (PCI-E or PCIe) PCIE bus and transmit data to support operation on a larger-scale neural network; the plurality of operation devices share the same control system or have their own control systems; the plurality of the operation devices share a memory or have their own memories; and the interconnection manner of the plurality of operation devices is an arbitrary interconnection topology.

In a fourth aspect, the embodiments of the present application provide a combined processing device which includes the operation device, the universal interconnect interface and other processing devices according to the first aspect. The neural network computing device interacts with other processing devices described above to perform user-specified operations.

In a fifth aspect, the embodiments of the present application provide a neural network chip which includes the operation device according to the first aspect, the neural network computing device according to the third aspect or the combined processing device according to the fourth aspect.

In a sixth aspect, the embodiments of the present application provide a neural network chip package structure which includes the neural network chip according to the fifth aspect;

In a seventh aspect, the embodiment of the present application provides a board card which includes the neural network chip package structure according to the sixth aspect.

In an eighth aspect, the embodiments of the present application provide an electronic device which includes the neural network chip according to the sixth aspect or the board card according to the seventh aspect.

It can be seen from the solution of the embodiments of the present application that the storage unit stores data and instructions, a controller unit configured to extract, from the storage unit, a first instruction including sorting instructions or sparse processing instructions and a first data corresponding to the first instruction including input neuron data and weight data and the operation unit performs a computing operation corresponding to the first instruction on the input neuron data and the weight data in response to the first instruction to obtain an operation result, thereby reducing the storage resource and operation resource consumption in the deep learning and improving the operation efficiency.

In addition, in some embodiments, the electronic device includes a data processing device, a robot, a computer, a printer, a scanner, a tablet PC, an intelligent terminal, a mobile phone, an automobile data recorder, a navigator, a sensor, a camera, a server, a cloud server, a video camera, a projector, a watch, an earphone, a movable storage, a wearable device, a vehicle, a household appliance and/or a medical device.

In some embodiments, the vehicle includes an airplane, a ship and/or a car; the household appliance includes a television, an air conditioner, a microwave oven, a refrigerator, a rice cooker, a humidifier, a washing machine, an electric lamp, a gas stove, a range hood; and the medical device includes nuclear magnetic resonance, B-ultrasonic and/or electrocardiographs.

BRIEF DESCRIPTION OF THE DRAWINGS

In order to more clearly illustrate the technical solutions in the embodiments of the present application, the drawings used in the description of the embodiments will be briefly introduced below. Obviously, the drawings in the following description are some embodiments of the present application, an ordinary person skilled in the art can also obtain other drawings based on these drawings without paying any creative work.

DETAILED DESCRIPTION

The technical solutions in the embodiments of the present application are clearly and completely described in the following with reference to the accompanying drawings in the embodiments of the present application. It is obvious that the described embodiments are a part of the embodiments of the present application, and not all of the embodiments. All other embodiments obtained by an ordinary person skilled in the art based on the embodiments of the present application are all within the protection scope of the present application.

The terms "first", "second", "third", "fourth" and the like in the description, the claims and the drawings of the present application are used to distinguish different objects rather than describing a specific order. Furthermore, the terms "include", "have" and any other transformations intended to cover a non-exclusive inclusion. For example, a process, method, system, product, or device that comprises a series of steps or units is not limited to the listed steps or units, but optionally also includes steps or units not listed or optionally includes other steps or units inherent to these processes, methods, products or devices.

"Embodiments" mentioned herein mean that a particular feature, structure, or characteristic described in connection with the embodiments included in at least one embodiment of the present application. The appearances of the phrases in various places in the specification are not necessarily referring to the same embodiments, nor independent or alternative embodiments that are mutually exclusive to other embodiments. What a person skilled in the art explicitly and implicitly understands is that the embodiments described herein can be combined with other embodiments.

Figure 1:
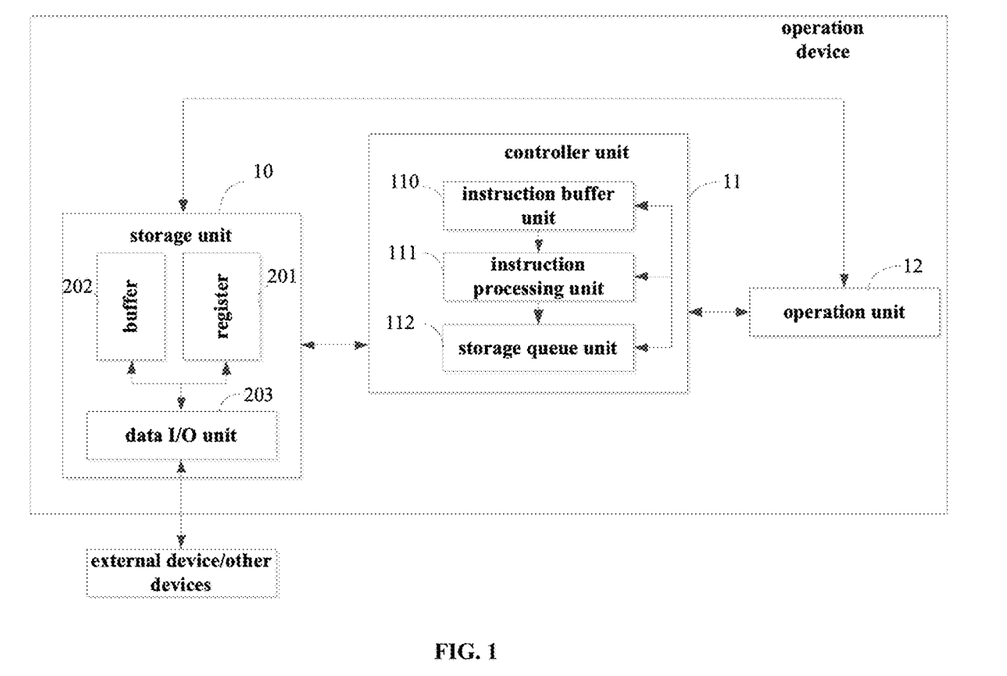
FIG. 1 shows a structural schematic diagram of an operation device according to embodiments of the present application.

The operation unit used in the present application will be described at first. Referring to FIG. 1, there is an operation device comprising: a storage unit 10, a controller unit 11 and an operation unit 12, wherein the controller unit 11 and the storage unit 10 and the operation unit 12;

the storage unit 10 may include a data input/output unit (data I/O unit) 203, the data input/output unit 203 is configured to acquire input data, weight data, a network model, and operation instructions;

the controller unit 11 is configured to extract a first instruction from the storage unit, parse the first instruction to obtain an operation code of the operation instruction and an operation domain, extract input data and weight data corresponding to the operation domain, and the operation code, the input data and the weight data are transmitted to the operation unit, and the operation code includes at least one of the following codes: an operation code of the matrix operation instruction, a vector operation instruction operation code, an activation operation instruction operation code, an offset operation instruction operation code, a convolution operation instruction operation code, a conversion operation instruction operation code and the like;

the operation unit 12 is configured to perform an operation corresponding to the operation code on the input data and the weight data according to the operation code to obtain a result of the first instruction.

Figure 3:
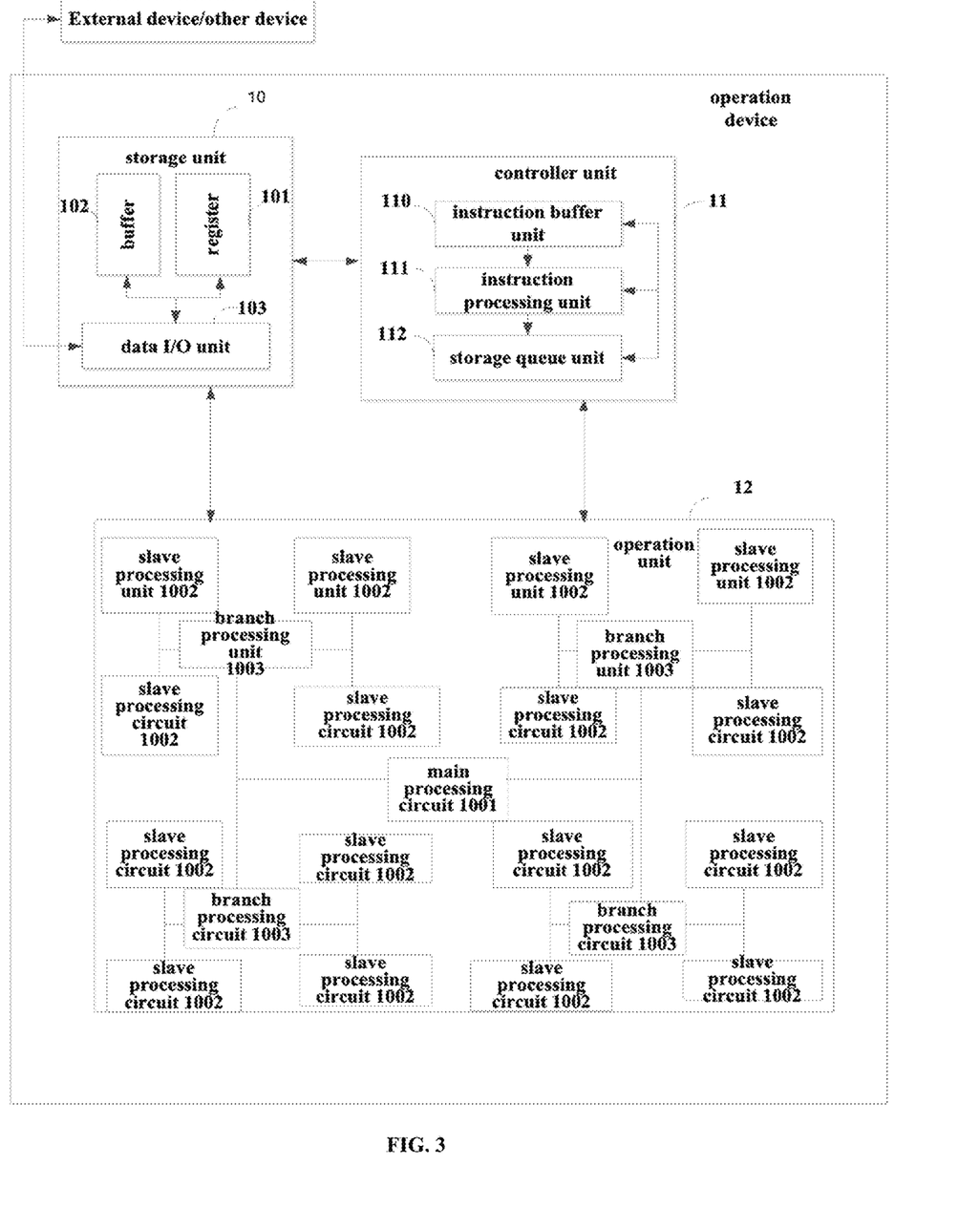
FIG. 3 shows another structural schematic diagram of an operation device according to embodiments of the present application.
Figure 4:
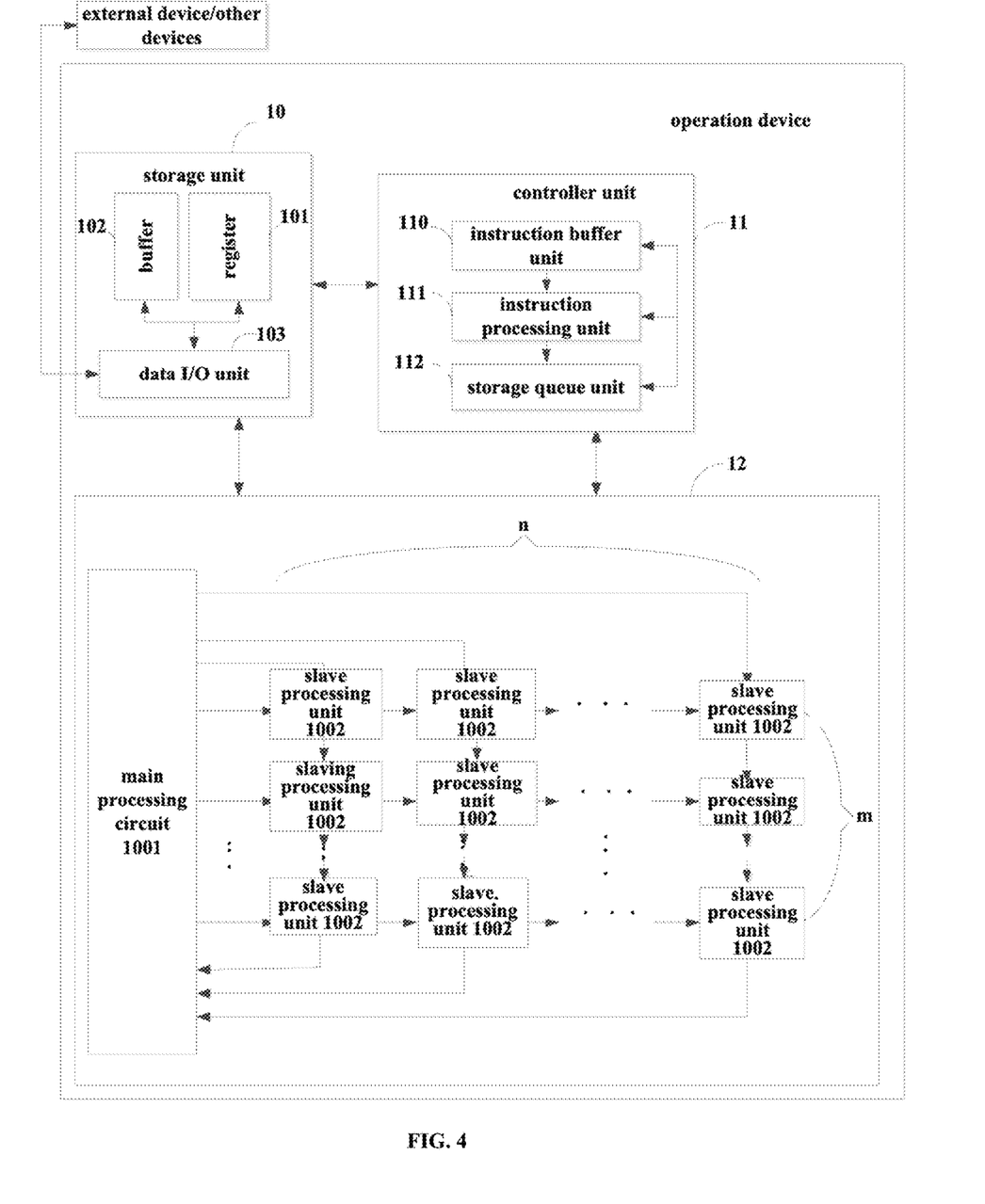
FIG. 4 shows a structural schematic diagram of another operation device according to embodiments of the present disclosure.

In an optional embodiment, FIG. 3 is a variant structure of the operation device as shown in FIG. 1, and the operation unit 12 as shown in FIG. 3 may include a branch processing circuit 1003; the specific connection structure is shown in FIG. 4, wherein, a master processing circuit 1001 is connected to a branch processing circuit 1003, and the branch processing circuit 1003 is connected to a plurality of slave processing circuit 1002;

the branch processing circuit 1003 configured to perform forwarding data or instructions between the master processing circuit 1001 and the slave processing circuit 1002.

Figure 2:
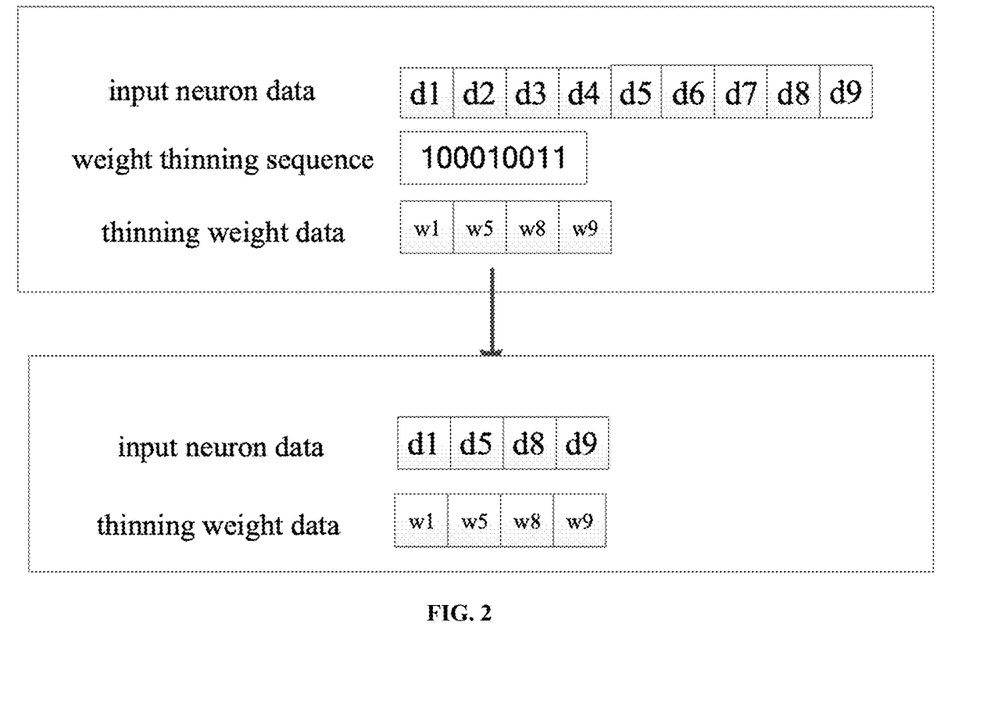
FIG. 2 shows a schematic diagram of a processing of the sparse mode 1 according to embodiments of the present application.

In another optional embodiment, the operation unit 12, as shown in FIG. 2, may include a master processing circuit 1001 and a plurality of slave processing circuits from 1002. In one embodiment, as shown in FIG. 2, a plurality of slave processing circuits are assigned in an array; each slave processing circuit is connected to other neighboring slave processing circuits, the master processing circuit is connected to k slave processing circuit of the plurality of slave processing circuits, said K basic circuits are n slave processing circuits in the first line, n slave processing circuits in the $m^{th}$ line and m slave processing circuits in the first column.

K slave processing circuits are configured to forward data and instructions between the master processing circuit and the plurality of slave processing circuits.

Figure 5:
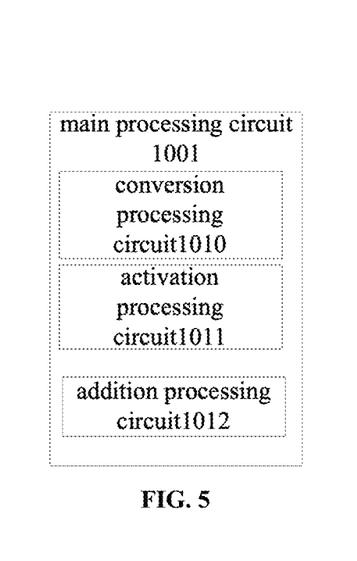
FIG. 5 shows a structural schematic diagram of a master processing circuit according to embodiments of the present application.

Optionally, as shown in FIG. 5, the master processing circuit may also include one or any combination of a conversion processing circuit 1010, an activation processing circuit 1011 and an addition processing circuit 1012;

a conversion processing circuit 1010 is configured to perform an interchange between the first data structure and the second data structure (for example, conversion between continuous data and discrete data) on a data block received by the master processing circuit or an intermediate result, or perform an interchange between the first data type and the second data type (for example, conversion between fixed-point type and floating-point type) on a data block or an intermediate result received by the master processing circuit;

the activation processing circuit 1011 is configured to perform activation operations of the data in the master processing circuit;

the addition processing circuit 1012 is configured to perform addition operations or accumulation operations.

The master processing circuit is configured to assign an input data to a plurality of data blocks and send at least one of the plurality of data blocks and at least one of the operation instructions to the slave processing circuit;

the plurality of slave processing circuits are configured to perform operations on the received data blocks according to the operation instruction to obtain an intermediate result and transmit the result of the operation to the master processing circuit;

the master processing circuit is configured to process an intermediate result sent by the plurality of slave processing circuits to obtain a result of that operation instruction and send the result of that operation instruction to the controller unit.

The slave processing circuit comprises a multiplication processing circuit;

The multiplication processing circuit is configured to perform a multiplication operation on the received data block to obtain a multiplication result;

a forwarding processing circuit (optionally) is configured to forward the received data block or the multiplication result.

an accumulation processing circuit, the accumulation processing circuit, is used to perform an accumulation operation on the multiplication result to obtain the intermediate result.

In another embodiment, the operation instruction is a computation instruction such as a matrix-multiplying-matrix instruction, an accumulation instruction, an activation instruction. The operation device provided by the present application sets up an interconnection unit which connects the calculator combinations in the operation unit according to the need of the operation instruction to obtain a operation topology structure corresponding to the operation instruction, and then it is unnecessary to perform storage or extraction operations on the operated intermediate data in the subsequent operation of the operation unit. This structure realizes an advantage that a single instruction can realize one-time input, that is, can perform a plurality of operations of a calculator and obtain computation results, thereby improving the commutating efficiency.

Figure 6:
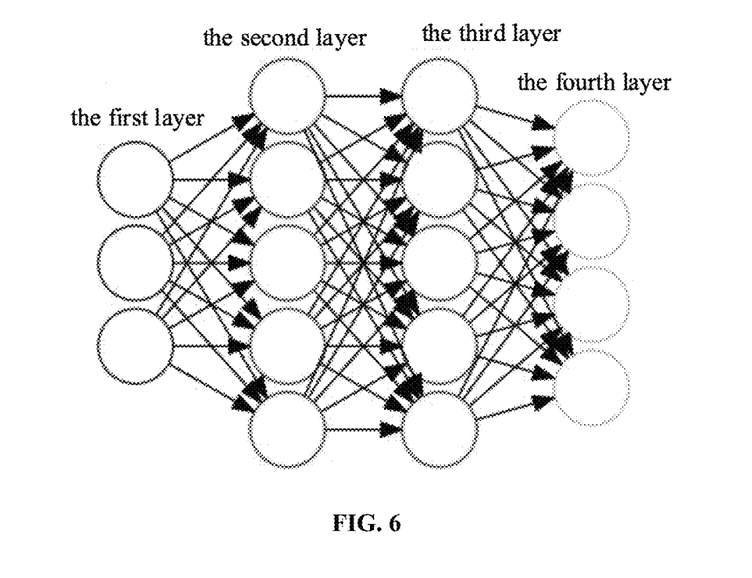
FIG. 6 shows a schematic diagram of a structure graph of a neural network model provided by an embodiment of the present application.

Among them, the data conversion unit 16 obtains a part of nodes in the structure graph from the external of the device, determines whether the node is processed by the operation unit 12 through the controller unit 11, and if it has been processed, the node is discarded without performing any operation and if it has been processed, the node is performed with a conversion of the node format, and after the conversion is completed, the converted node is written into the storage unit 10. The controller unit 11 reads the instruction from the external of the operation device and writes it to the storage unit 10 without a conversion. The node of the structure graph (as shown in FIG. 6 which provides a schematic diagram of the structure graph) obtained from the external of the device for the first time is a source node s, and the node obtained for the $i_{th}$ time is an adjacent node of the candidate node after the $(i-1)_{th}$ (i>1) computation and the adjacent node is not processed by the operation unit. Optionally, the node n of the structure graph obtained from the external of the device is converted into the following format:

(Addr(before(n)),F(n),n,vis)

wherein before(n) represents precursor node of the node n, (Addr(before(n)) represents an address of the precursor node of node n in the storage unit 10, F(n) represents the total cost generated on the path from the source node s to the node n, and n represents the attribute of the node for computing the resulting cost of a single node n, vis represents whether this node has been accessed, for example, it is labeled as 0 if it is not accessed and it is labeled as 1 if it is accessed, and as to the source node before(n), it is n itself, F(n) and vis are both set to 0.

A storage unit 10 is configured to acquire the instruction and the converted data from the data conversion unit i.e., data conversion unit 14, provide data to the operation unit 12, store the data processed by the operation unit 12, obtain an approximate optimal path result, and store, and finally write the approximate optimal path result back to the external of the device.

An operation unit 12 acquires, from the storage unit 10, the node with vis=0 in the node information, that is, the node that has not been accessed, and the partial information of the precursor node of this node is integrated into that node to form the following format:

(F(before(n)),F(n),n,vis)

wherein, F(before(n))represents the price-value corresponding to the path of the precursor node from the source node s to n, F(n)=0. In the operation unit, the price-value generated by the node n is operated based on the preset cost function, and then the total price-value F(n)=f(n)+F(before(n) corresponding to the path from the source node to the node n is obtained. At this time, there are m nodes transmitted to the operation unit 12, respectively $n_1, n_2, \ldots n_m$, and the price-values $F(n_1), F(n_2), \ldots F(n_m)$ corresponding to m paths can be operated. The corresponding m nodes are sorted in order of the price-value $F(n_1), F(n_2), \ldots F(n_m)$ from small to large to obtain $n_1', n_2', \ldots n_m'$. It is determined whether the path from the source node s to $n_1'$ constitutes a complete approximate optimal path, and if so, an operation termination instruction is transmitted to the controller unit 11, and the node information (Addr (before(n)), F(n), n, 1) corresponding to $n_1'$ is transmitted to the storage unit 10. The preset cost function in the embodiments of the present application may be at least one of the following functions: a mean square error cost function, a cross entropy cost function, or a cost function in a neural network.

Optionally, it is assumed that the operation device allows the maximum number of candidate nodes to be k. When m<k, the corresponding m nodes can be used as candidate nodes, and the updated (Addr(before(n)), F(n), n, 1) are written into the storage unit 10; when m >k, the node information (Addr(before(n)), F(n), n, 1) corresponding to $n_1'$, $n_2'$, ... $n_k'$ can be written back to the storage unit 10.

The operation unit 12 can maintain an empty stack inside the unit, and after receiving the integration instruction transmitted by the controller unit 11, integrate the node information (Addr(before(n)), F(n), n, 1), specifically, push the node n into the stack, and then, acquire the precursor node of the top node of the stack from the storage unit 10 and push it into the stack until before(n) in the information of the top node of the stack is n, that is, the top node of the stack is the source node of the graph. Then, the nodes in the stack continuously pop out of the stack and are transmitted to the storage unit 10 in order, and the sequence of nodes acquired in the storage unit 10 is the approximate optimal path finally obtained.

The controller unit 11 acquires an instruction required for the operation through the storage unit 10, and the storage unit 10 reads the node that was stored from the external of the operation device last time and has not been operated by the operation unit 12, controls the operation unit 12 to perform the data operation, receives the operation termination instruction transmitted by the operation unit 12, and controls the data transmission between the operation unit 12 and the storage unit 10.

Figure 7:
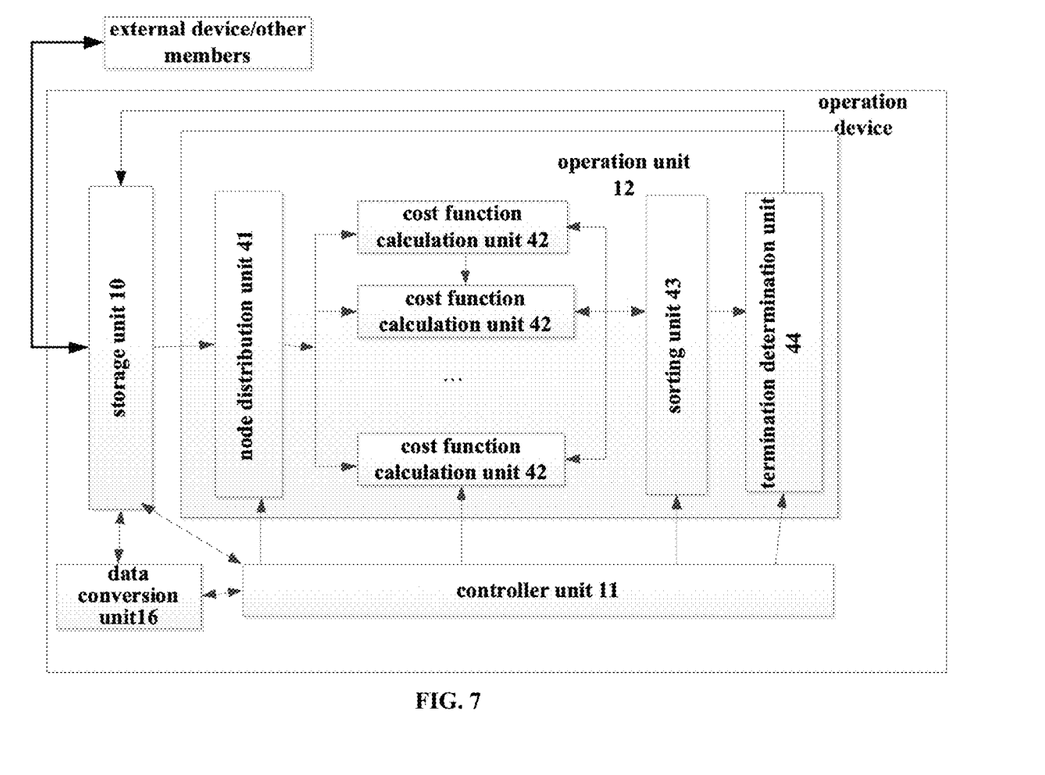
FIG. 7 shows another structural schematic diagram of an operation device according to embodiments of the present disclosure.

Referring to FIG. 7, the operation unit 12 in FIG. 7 includes a node distribution unit 41, a cost function computation unit 42, a sorting unit 43 and a termination determination unit 44.

Wherein, the node distribution unit 41 assigns the nodes $n_1$, $n_2$, ... $n_m$ acquired by the operation unit 12 to the L cost function computation units 42 respectively which computes corresponding path costs, where the first L−1 cost function computation units assign [m/L] nodes respectively, the Lth cost function computation units assign m−[m/L] nodes, where "[ ]" indicates rounding up.

As shown in FIG. 7, there are L cost function computation units in total, and each cost function computation unit 42 can realize the price-value from the source node to the corresponding path independently. Each cost function computation unit 42 computes the node assigned by the node distribution unit 41 to obtain the corresponding node number-path price-value pairs ($n_1$, F($n_1$)), ($n_2$, F($n_2$)), ... ($n_m$, F($n_m$)), compute the cost of the path function according to actual needs, set up by the controller unit 11, then, transmit the operated node number-path price-value pairs ($n_1$, F($n_1$)), ($n_2$, F($n_2$)), ... ($n_m$, F($n_m$)) to the sorting unit 43.

Optionally, the cost function computation unit may include a multiplier and an adder.

The sorting unit 43 sorts the node number-path cost value pairs ($n_1$, F($n_1$)), ($n_2$, F($n_2$)), ... ($n_m$, F($n_m$)) of each node obtained from the cost function computation unit 32 according to the cost value of the path from small to large to obtain the sorted node number-path cost value pairs ($n_1'$, F($n_1$))', ($n_2'$, F($n_2$))', ... ($n_m'$, F($n_m$))' and then transmit them to the termination determination unit 34.

The termination determination unit 44 obtains the sorted node number-path cost value pairs from the sorting unit 43 and determines whether the approximate optimal path has been obtained according to ($n_1'$, F($n_1$))', where the method to determine whether the approximate optimal path has been obtained is set by the controller unit 11 according to the actual problem. If the approximate optimal path has been obtained, the termination determination unit 34 sends the operation termination instruction to the controller unit 11 and sends the node information (Addr(before(n)), F(n), n, 1) corresponding to $n_1'$ to the result storage unit 11. Otherwise, assuming that the maximum number of candidate nodes allowed by the device is k, if m≤k, the corresponding m nodes, which are all taken as candidate nodes, write the updated (Addr(before(n)), F(n), n, 1) back to the storage unit 10; if m>k, write the node information (Addr(before(n)), F(n), n, 1) corresponding to $n_1'$, $n_2'$, ... $n_k'$ back to the storage unit 10.

For example, an optimal path searching method is provided as follows:

Step 1: obtaining the operation instructions required for the operation from the external of the operation device, storing them in the storage unit 10 through a data conversion unit 16 and transmitting them to the controller unit 11.

Step 2: transmitting some nodes in the original graph to data conversion unit 16 from the external of the operation device, and the structure diagram external the device can be adjacency list, adjacency matrix, vertex pairs or other forms, where only the source node s was transmitted at the first transmission, and the nodes which are then transmitted to the data transmission unit 1 are adjacent nodes that have not been processed by the operation unit 12 of the candidate node screened by the operation unit 12 last time. In this process, the controller unit 11 determines whether the corresponding nodes have been processed by operator unit 12. The data conversion unit 16 converts the transmitted nodes in a format (Addr(before(n)), F(n), n, vis) and transmits them to the storage unit 10.

In step 3, the controller unit 11 controlling the operation unit 12 to acquire the unprocessed nodes $n_1$, $n_2$, ... $n_m$ that are transmitted by the data conversion unit 16 from the storage unit 10 and integrating the information of each node and the precursor node to obtain the nodes in a format of (Addr(before(n)), F(n), n, vis); then the operation unit 12 obtaining the total price-value F(n)=f(n)+F(before(n)) corresponding to the path from the source node to node n based on the price-value f(n) resulted by the preset cost function computing the node n. Computing the price-values F($n_1$), F($n_2$), ... F($n_m$) corresponding to m paths respectively, obtaining $n_1'$, $n_2'$, ... $n_m'$ by sorting the corresponding m nodes in an order of the price-value F($n_1$), F($n_2$), ... F($n_m$) from small to large, and determining whether the path from the source node s to $n_1'$ constitutes a complete approximate optimal path. If so, send an operation termination instruction to the controller unit 11 and transmit the node information (Addr(before(n)), F(n), n, 1) corresponding to $n_1'$ to the storage unit 10, and goes to step 4. Otherwise, assuming that the maximum number of candidate nodes allowed by the device is k, if m≤k, the corresponding m nodes are all taken as candidate nodes to write the updated (Addr(before(n)), F(n), n, 1) to the storage unit 10; if m>k, write the node information (Addr(before(n)), F(n), n, 1) corresponding to $n_1'$, $n_2'$, ... $n_k'$ back to the storage unit 10, and goes to step 2.

In step 4, after receiving the operation termination instruction from the operation unit 12, the controller unit 11 determines whether the result storage unit 11 has obtained node information from the operation unit 12, and if the node information is not obtained, the determination is circularly made until the node information is obtained; the result storage unit 11 maintains an empty stack within the unit, and after the operation result is obtained, pushes the node information (Addr(before(n)), F(n), n, 1) received from the operation unit 12 into the stack; the precursor node of the top node of the stack is obtained from the storage unit 10 and is pressed into the stack, which is repeated until before(n) in the information of the top node of the stack is n, that is, the top node of the stack is the source node of the graph. Then the storage unit 10 continuously pushing the nodes out of the stack and sending them into the storage unit 10 in order, and then the sequence of nodes obtained in the storage unit 10 is the approximate optimal path finally obtained.

In step 5, the storage unit 10, under control of the controller unit 11, obtains an approximate optimal path from the storage unit 10 and transmits it to the external of the device.

Find an approximate optimal path that can satisfy the conditions by using the embodiments of the present application to search the structure graphs can reduce the waste of space effectively and improves the efficiency of time, and in the process of computing the cost of path, performing computation by using a plurality of cost function computation units at the same time can improve the parallelism of computation.

It should be explained that the above operation device can not only perform sparse neural network operations but also perform dense neural network operations. The above device is especially suitable for sparse neural network operations because there are many data with zero value or small absolute value in the sparse neural network. These data can be presented by the mapping unit, and the efficiency of operation can be improved if the accuracy of operation is guaranteed.

It should be pointed out that the input neurons and operation results (or output neurons) mentioned in the embodiments of the present application do not refer to neurons in the input layer and neurons in the output layer of the whole neural network, but for any adjacent two layers of neurons in the neural network, the neurons in the lower layer of the network feedforward operation is the input neurons, the neurons in the upper layer of the network feedforward operation is the operation result. Taking the convolution neural network as an example, and assuming that a convolution neural network has L layers, K=1,2,3 ... L−1. For the layer K and the layer K+1, the layer K is called the input layer, and the neurons in this layer are the above input neurons, and the layer K+1 is called the input layer. The neurons in this layer are the above operation results, that is, except the top layer, each layer can be the input layer, and the next layer is the corresponding output layer.

Each of the above units may be a hardware circuit including a digital circuit, an analog circuit, or the like. Physical implementations of the hardware circuit include, but are not limited to, physical devices including, but not limited to, transistors, memristors and the like. The computation unit in the above neural network computing module may be any suitable hardware processor such as a CPU, GPU, FPGA, DSP, ASIC and the like. The above storage unit, the instruction buffering unit, the first input buffer unit, the second input buffer unit and the output buffer unit may be any suitable magnetic storage medium or magneto-optical storage medium, such as RRAM, DRAM, SRAM, EDRAM, HBM, HMC and the like.

In a possible embodiment, the embodiment of the present application provides a neural network computing device, where the neural network computing device includes one or more neural network operation modules according to the embodiments for acquiring data to be operated and control information from other processing devices, performing the specified neural network operation, and transmitting the execution result to other processing devices through an I/O interface;

when the neural network computing device includes a plurality of the neural network operation modules, the plurality of neural network operation modules may connect through a specific structure and transmit data;

wherein the plurality of operation devices interconnect through the PCIE bus to support operations of a larger-scale neural network and transmit data; the plurality of operation devices share the same control system or have respective control systems and the devices share a memory or have their own memories; the interconnection manner of the plurality of operation devices is an arbitrary interconnection topology.

The neural network computing device has high compatibility and can be connected to various types of servers through a PCIE interface.

In a possible embodiment, the embodiments of the present application provide a combined processing device including the above-described neural network computing device, a universal interconnection interface and other processing devices.

Figure 8:
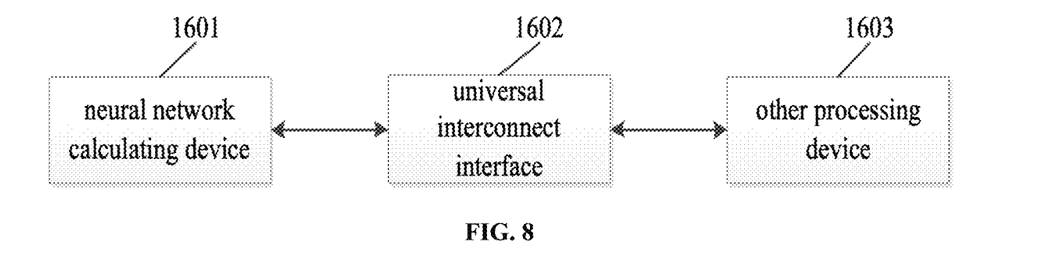
FIG. 8 shows a structural schematic diagram of a combined processing device according to embodiments of the present application.

The neural network computing device interacts with other processing devices to perform user-specified operations. Referring to FIG. 8, FIG. 8 shows a schematic structural diagram of a combined processing apparatus according to embodiments of the present application. As shown in FIG. 8, the combined processing device includes the above-described neural network computing device 1601, universal interconnect interface 1602, and other processing devices 1603.

The above other processing device 1603 includes a processor type of one or more of a general-purpose/dedicated processor such as a central processing unit, a graphics processing unit (GPU) and a neural network processor. The number of processors included in the other processing device 1603 is not limited. The other processing device 1603 serving as an interface between the neural network computing device 1601 and the external data and the control includes data moving, completing basic control such as starting and stopping of the neural network computing device; the other processing device 1603 can also cooperate with the neural network computing device 1601 to complete the operation task.

The above universal interconnect interface 1602 is configured to transmit data and control instructions between the neural network computing device 1601 and other processing devices 1603. The neural network computing device 1601 obtains the required input data from other processing devices 1603 to write the storage device on the chip of the neural network computing device 1601, acquire the control instruction from other processing device 1603 to write in the control buffer on the chip of the neural network computing device 1601 and data in the storage device of the neural network computing device 1601 can also be read to transmit to other processing devices 1603.

Figure 9:
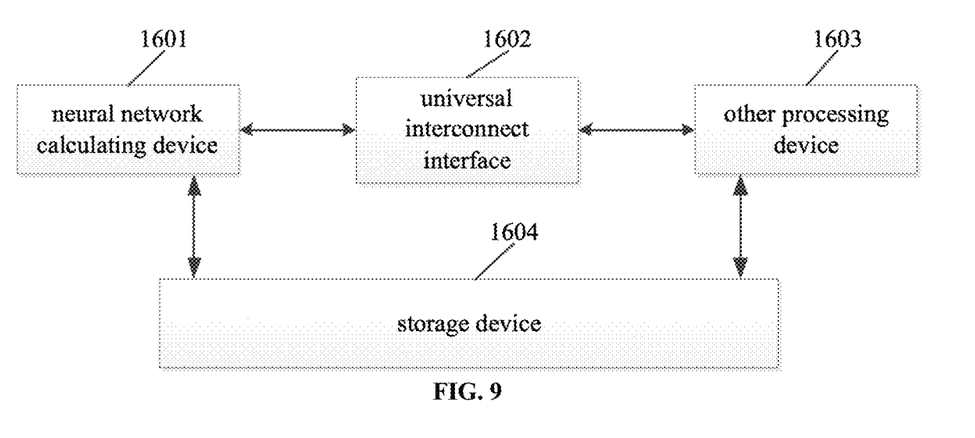
FIG. 9 shows a structural schematic diagram of another combined processing device according to embodiments of the present application.

Optionally, as shown in FIG. 9, the above combined processing device further includes a storage device 1604 configured to store data required by the present operation unit/operation device or other operation units and is particularly suitable for the data required to be computed but cannot be completely stored in the internal memory of the present network operation device 1601 or other processing device 1603.

The above combination device can be used as an on-chip system for smart devices such as mobile phones, robots, and drones, effectively reducing the core area of the control portion, increasing the processing speed and reducing the overall power consumption.

In a possible embodiment, the embodiments of the present application provide a neural network chip which includes the operation device described in any of the illustrated embodiments or the above-described neural network computing device or the combined processing device.

In a possible embodiment, the embodiments of the present application provide a neural network chip package structure which includes the above neural network chip.

In a possible embodiment, the embodiments of the present application provide a board card which includes the above neural network chip package structure.

In a possible embodiment, the embodiments of the present application provide an electronic device including the above-mentioned board card.

The electronic device includes a data processing device, a robot, a computer, a printer, a scanner, a tablet, a smart terminal, a mobile phone, a driving recorder, a navigator, a sensor, a camera, a cloud server, a camera, a camera, a projector, and a watch, headsets, a removable storage, a wearable device vehicle, a household appliance, and/or a medical device.

The above-mentioned transportation includes airplanes, ships and/or vehicles; the above-mentioned household appliances include televisions, air conditioners, microwave ovens, refrigerators, rice cookers, humidifiers, washing machines, electric lights, gas stoves, range hoods; the medical equipment includes nuclear magnetic resonance instruments, B-mode ultrasound instrument and/or electrocardiograph.

The embodiments of the present application further provide a computer storage medium, wherein the computer storage medium may store a program, and the program includes some or all of the steps of any one of the neural network operation methods according to the method embodiments. It should be noted that, for the foregoing method embodiments, for the sake of brevity, they are all described as a series of action combinations, but those skilled in the art should understand that the present application is not limited by the described action sequence. It is because certain steps may be performed in other sequences or concurrently in accordance with the present application. Secondly, those skilled in the art should also understand that the embodiments described in the specification are optional embodiments, and the actions and modules involved are not necessarily required by the present application.

In the above embodiments, the descriptions of the various embodiments are all focused on, and the parts that are not detailed in a certain embodiment can be referred to the related descriptions of other embodiments.

In the several embodiments provided herein, it should be understood that the disclosed apparatus may be implemented in other ways. For example, the device embodiments described above are merely illustrative, for example, the division of the unit is only a logical function division and there may be another division manner in the actual implementation, for example, multiple units or components may be combined or may be integrated into another system, or some features can be ignored or not performed. In addition, the mutual coupling or direct coupling or communication connection shown or discussed may be an indirect coupling or communication connection through some interfaces, devices or units, and may be electrical or other forms.

The units described as separate components may or may not be physically separated, and the components displayed as units may or may not be physical units, that is, may be located in one place, or may be assigned to multiple network units. Some or all of the units may be selected according to actual needs to achieve the purpose of the solution of the embodiment.

In addition, each functional unit in each embodiment of the present application may be integrated into one processing unit, or each unit may exist physically separately, or two or more units may be integrated into one unit. The above integrated unit can be implemented in the form of hardware or in the form of a software program module.

The integrated unit, if implemented in the form of a software program module and sold or used as a standalone product, may be stored in a computer readable memory. Based on such an understanding, the technical solution of the present application, in essence or the contribution to the prior art, or all or part of the technical solution may be embodied in the form of a software product, which is stored in a memory. A number of instructions are included to cause a computer device (which may be a personal computer, server or network device, etc.) to perform all or part of the steps of the methods described in various embodiments of the present application. The foregoing memory includes: a U disk, a Read-Only Memory (ROM), a Random Access Memory (RAM), a removable hard disk, a magnetic disk, or an optical disk, and the like which can store program codes.

An ordinary person skilled in the art can understand that all or part of the steps of various methods of the above embodiments can be implemented by a program to instruct related hardware, the program can be stored in a computer readable memory, and the memory may include a flash disk, a Read-Only Memory (ROM), a Random Access Memory (RAM), disk or CD and the like.

The embodiments of the present application have been described in detail. The principles and implementations of the present application are described in the specific examples, and the description of the above embodiments is only used to help to understand the method and core ideas of the present application; meanwhile, a person skilled in the art may have a change in the specific embodiments and the scope of application according to the idea of the present application. In summary, the content of the present specification should not be construed as limiting the present application.

The invention claimed is:

1. An operation device comprising a data conversion circuit, an operation circuit, and a result storage circuit, wherein
the data conversion circuit is configured to:
obtain an instruction and node data of one or more nodes from an external device to the operation device and
convert format of the node data, wherein the converted format of each of the one or more nodes at least includes information that identifies a precursor node of each of the one or more nodes, information that represents an address of the precursor node in a storage circuit, information that represents a total price-value generated on a path from a source node to each of the one or more nodes;
the operation circuit is configured to:
obtain unprocessed node data,
compute the total price-value of the path from the source node to a corresponding node,
select first k nodes with lowest total price-value as candidate nodes, where k is a maximum number of candidate nodes allowed by the operation device,
determine whether an approximate optimal path is obtained according to the nodes with lowest total price-value, if the approximate optimal path has not been obtained, continue to obtain the unprocessed node data for computation and determination, and if the approximate optimal path has been obtained, write the nodes with lowest total price-value and a precursor node of the node with the lowest total price-value to the result storage circuit; and the result storage circuit is configured to continuously search for the precursor node according to a tail node of the approximate optimal path obtained from the operation circuit until the precursor node coincides with the source node so as to obtain an optimal path.

2. The operation device of claim 1,
t wherein the storage circuit is configured to:
obtain, from the data conversion circuit, the instruction and the node data after the node data is converted, and
store the optimal path obtained by the result storage circuit.

3. The operation device according to claim 2, wherein the operation circuit includes:

a node distribution circuit configured to assign the nodes acquired by the operation circuit to a plurality of cost function computation circuits respectively, wherein the plurality of cost function computation circuits are configured to compute a price-value of a path from the source node to a corresponding path to obtain node number-path price-value pairs, a sorting circuit configured to:

sort node number-path cost value pairs of each node obtained from the cost function computation circuit according to a cost value of the path from small to large to obtain sorted node number-path cost value pairs, and transmit them to a termination determination circuit, wherein the termination determination circuit is configured to obtain the sorted node number-path cost value pairs from the sorting circuit and determine whether the approximate optimal path has been obtained, wherein if the approximate optimal path has been obtained, the termination determination circuit is configured to send an operation termination instruction to the controller circuit and to send node data corresponding to the node with the lowest total price-value to the result storage circuit, and if the approximate optimal path has not been obtained, assuming that the number of sorted nodes is m, if m≤k corresponding m nodes are all taken as candidate nodes and written back to the storage circuit, if m >k, node data corresponding to sorted k nodes are written back to the storage circuit.

4. The operation device according to claim 1, wherein the data conversion circuit is further configured to convert a node n of a structure graph, which is obtained from the external device of the operation device, into the following format:

(Addr(before(n)), F(n), n, vis)

where before(n) represents the precursor node of the node n, (Addr(before(n)) represents the address of the precursor node of the node n in the storage circuit, F(n) represents the total price-value generated on the path from the source node s to the node n, vis represents whether the node n has been accessed, wherein the node n is labeled as 0 if it is not accessed, and the node n is labeled as 1 if it is accessed.

5. The operation device of claim 1, further comprising:
a controller circuit configured to:

execute the instruction, and
control the data conversion circuit, the operation circuit, and the result storage circuit respectively.

6. The operation device of claim 2, wherein the storage circuit is further configured to transmit the optimal path to the external device of the operation device.

7. The operation device of claim 1, wherein the structure graph is in the form of adjacency list, adjacency matrix, or vertex pairs.

8. An operation method, comprising
obtaining an instruction, and storing the instruction into a storage circuit through a data conversion circuit;
transmitting node data of one or more nodes in an original graph to the data conversion circuit,
converting, by the data conversion circuit, format of the node data wherein the converted format of each of the one or more nodes at least includes information that identifies a precursor node of each of the one or more nodes, information that represents an address of the precursor node in a storage circuit, information that represents a total price-value generated on a path from a source node to each of the one or more nodes, and transmitting the nodes after the format conversion to a storage circuit;
by an operation circuit, obtaining node data that has not been operated, computing a total price-value of a path from a source node to a corresponding node, selecting first k nodes with a lowest total price-value as candidate nodes, where k is a maximum number of candidate nodes allowed by the operation device,
determining whether an approximate optimal path is obtained according to a node with the lowest total price-value,
if the approximate optimal path has not been obtained, continuing to obtain the node data that has not been operated for computation and determination, and
if the approximate optimal path has been obtained, writing the node with the lowest total price-value and a precursor node of the node with the lowest total price-value to a result storage circuit;
continuously searching, by the result storage circuit, for the precursor node according to a tail node of the approximate optimal path obtained from the operation circuit until the precursor node coincides with the source node so as to obtain an optimal path; and
obtaining and transmitting, by the storage circuit, the optimal path to the external of the operation device.

9. The operation method of claim 8, wherein the format conversion includes:
converting a node n of the structure graph, which is obtained from the external of the operation device, into the following format:

(Addr(before(n)), F(n), n, vis)

where (before(n) represents a precursor node of the node n, (Addr(before(n)) represents an address of the precursor node of the node n in the storage circuit, F(n) represents a total price-value generated on the path from a source node s to the node n, vis represents whether the node n has been accessed, wherein the node n is labeled as 0 if it is not accessed, and the node n is labeled as 1 if it is accessed.

10. The operation method of claim 9, wherein computing, by the operation circuit, the approximate optimal path includes:
obtaining, by the operation circuit, the total price-value $F(n)=f(n)+F(before(n))$ corresponding to the path from the source node to node n based on a price-value f(n) resulted by computing the node n by a cost function, computing price-values F(n1), F(n2), ... F(nm) corresponding to m paths respectively;

obtaining n1', n2', ... nm' by sorting corresponding m nodes in ascending order of the price-values F(n1), F(n2), ... F(nm), and determining whether the path from the source node s to n1' constitutes a complete approximate optimal path, if the path from the source node s to n1' constitutes a complete approximate optimal path, sending an operation termination instruction to a controller circuit and transmitting node information (Addr(before(n)), F(n), n, 1) corresponding to n1' to the result storage circuit, and going to a next step, if the path from the source node s to n1' does not constitute a complete approximate optimal path, assuming that the maximum number of candidate nodes allowed by the operation device is k, if m≤k taking all the corresponding m nodes as candidate nodes and writing updated (Addr(before(n)), F(n), n, 1) to the storage circuit, if m>k, writing the node information (Addr(before(n)), F(n), n, 1) corresponding to n1', n2', ... nk' back to the storage circuit.

11. The operation method of claim 10, wherein computing the price-values F(n1), F(n2), ... F(nm) corresponding to the m paths respectively includes:

setting a plurality of cost function computation circuits to compute the price-values corresponding to the m paths respectively.

12. The operation method of claim 10, wherein continuously searching, by the result storage circuit, for the precursor node according to the tail node of the approximate optimal path obtained from the operation circuit until the precursor node coincides with the source node so as to obtain an optimal path includes:

maintaining an empty stack inside the result storage circuit, after receiving an integration instruction transmitted by the controller circuit, pushing the node information (Addr(before(n)), F(n), n, 1) received from the operation circuit into the stack, acquiring a precursor node of a top node of the stack from the storage circuit, and pushing the precursor node of the top node into the stack until before(n) in the information of the top node of the stack is n, where the top node of the stack is the source node of the graph, by the result storage circuit, continuously popping the nodes in the stack out of the stack, and transmitting the nodes popped out of the stack to the storage circuit in order, where a sequence of nodes acquired in the storage circuit is the approximate optimal path finally obtained.

13. The operation method of claim 8, wherein the structure diagram is in the form of adjacency list, adjacency matrix, or vertex pairs.

14. The operation method of claim 8, further comprising transmitting, by the storage circuit, the optimal path to the external of the operation device.

15. The operation method of claim 8, further comprising controlling, by the controller circuit, the data conversion unit, the operation unit and the result storage circuit.

* * * * *